US007777758B2

(12) United States Patent
Yhann et al.

(10) Patent No.: US 7,777,758 B2
(45) Date of Patent: Aug. 17, 2010

(54) AUTOMATIC TRAPPING OF DROP SHADOWS

(75) Inventors: Stephan R. Yhann, Renton, WA (US); Robert Stevenson, Seattle, WA (US); Douglas Richard Becker, Ayer, MA (US)

(73) Assignee: Adobe Systems Incorporated, San Jose, CA (US)

( * ) Notice: Subject to any disclaimer, the term of this patent is extended or adjusted under 35 U.S.C. 154(b) by 309 days.

(21) Appl. No.: 11/546,507

(22) Filed: Oct. 10, 2006

(65) Prior Publication Data
US 2008/0088643 A1    Apr. 17, 2008

(51) Int. Cl.
G09G 5/02    (2006.01)

(52) U.S. Cl. ............... 345/592; 345/426; 345/589; 345/629; 382/168; 382/274; 382/284

(58) Field of Classification Search ............. None
See application file for complete search history.

(56) References Cited

U.S. PATENT DOCUMENTS

| | | | |
|---|---|---|---|
| 4,583,116 A | 4/1986 | Hennig et al. |
| 4,931,861 A | 6/1990 | Taniguchi |
| 5,029,115 A | 7/1991 | Geraci |
| 5,113,249 A | 5/1992 | Yosefi |
| 5,131,058 A | 7/1992 | Ting |
| 5,295,236 A | 3/1994 | Bjorge et al. |
| 5,313,570 A | 5/1994 | Dermer et al. |
| 5,355,446 A | 10/1994 | Maayan |
| 5,459,818 A | 10/1995 | Grant et al. |
| 5,471,566 A | 11/1995 | Kirk |
| 5,542,052 A | 7/1996 | Deutsch et al. |
| 5,613,046 A | 3/1997 | Dermer |
| 5,666,543 A | 9/1997 | Gartland |
| 5,668,931 A | 9/1997 | Dermer |
| 5,715,331 A | 2/1998 | Hollinger |
| 6,031,544 A | 2/2000 | Yhann |
| 6,049,339 A | 4/2000 | Schiller et al. |
| 6,141,462 A | 10/2000 | Yoshino et al. |
| 6,236,754 B1 | 5/2001 | Harrington |
| 6,345,117 B2 | 2/2002 | Klassen |

(Continued)

OTHER PUBLICATIONS

"How to trap using Adobe trapping technologies", Copyright 2002 Adobe Systems Incorporated, [online], [retrieved Aug. 8, 2006] Retrieved from the Internet: http://www.adobe.com/products/extreme/pdfs/trapping.pdf.

(Continued)

Primary Examiner—Antonio A Caschera
(74) Attorney, Agent, or Firm—Fish & Richardson P.C.

(57) ABSTRACT

Methods, program products and systems for automatically trapping drop shadows. For at least one segment incident to an atomic region which includes a drop shadow, and for each side of the segment, determining a first flattened color of the side's incident atomic region, and if the atomic region includes a drop shadow, additionally determining a second flattened color omitting the color of the drop shadow. An effective neutral density from the side's first flattened color is determined and, if the side has a second flattened color, the side's second flattened color. The two atomic regions incident to the segment are trapped based upon the effective neutral densities for the respective sides.

24 Claims, 11 Drawing Sheets
(6 of 11 Drawing Sheet(s) Filed in Color)

U.S. PATENT DOCUMENTS

| | | |
|---|---|---|
| 6,366,361 B1 | 4/2002 | Dermer et al. |
| 6,594,030 B1 | 7/2003 | Ahlstrom et al. |
| 6,654,145 B1 | 11/2003 | Speck |
| 6,697,078 B2 | 2/2004 | Becker et al. |
| 6,781,591 B2 * | 8/2004 | Raskar .................. 345/582 |
| 6,781,720 B1 | 8/2004 | Klassen |
| 6,850,338 B1 * | 2/2005 | Aschenbrenner et al. ... 358/1.15 |
| 6,894,704 B1 | 5/2005 | Bourdev et al. |
| 6,903,741 B2 | 6/2005 | Corbetta |
| 6,987,585 B1 | 1/2006 | Becker |
| 7,075,551 B2 | 7/2006 | Becker et al. |
| 7,123,381 B2 | 10/2006 | Klassen |
| 7,139,098 B2 | 11/2006 | Klassen |
| 7,239,314 B2 * | 7/2007 | Johnston .................. 345/426 |
| 7,242,415 B1 | 7/2007 | Yhann et al. |
| 2003/0090689 A1 | 5/2003 | Klassen |
| 2003/0179394 A1 | 9/2003 | Lane et al. |
| 2003/0214534 A1 | 11/2003 | Uemura et al. |
| 2004/0141194 A1 | 7/2004 | Gupta et al. |
| 2004/0212628 A1 | 10/2004 | Becker et al. |

OTHER PUBLICATIONS

PDF Reference fifth edition, Adobe Portable Document Format Version 1.6, 1984-2004 Adobe Systems Incorporated, [online], [retrieved Aug. 8, 2006] Retrieved from the Internet: http://partners.adobe.com/public/developer/en/pdf/PDFReference16.pdf.

"Adobe Design Center—Tutorials on how to use Adobe and Macromedia products together," © 2006 Adobe Systems Incorporated, [retrieved Oct. 10, 2006] Retrieved from the Internet: http://www.adobe.com/designcenter/tutorials/trapping/.

International Search Report for PCT Application No. PCT/US2007/080839 mailed Jun. 10, 2008, 18 pages.

International Preliminary Report on Patentability for PCT Application No. PCT/US2007/080839 mailed Apr. 15, 2009, 7 pages.

* cited by examiner

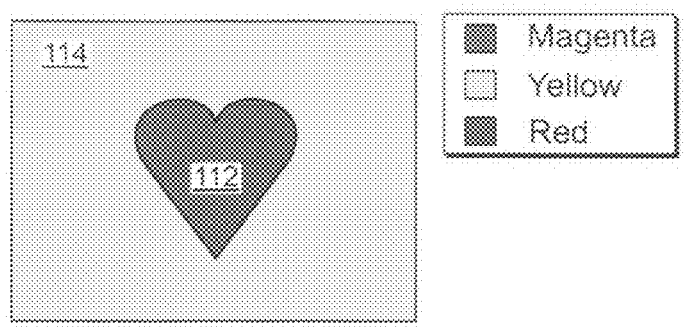
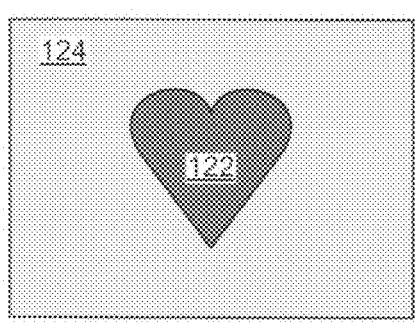 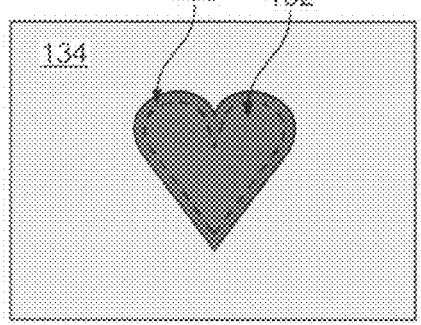
FIG. 1A
(Prior Art)
FIG. 1B
(Prior Art)
FIG. 1D
(Prior Art)
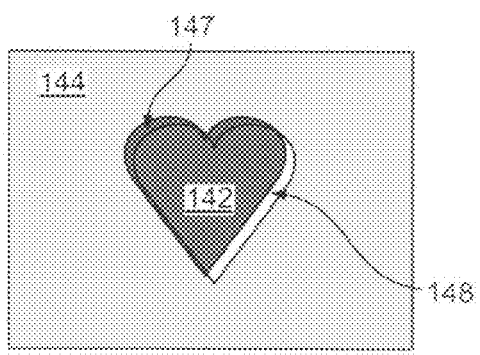 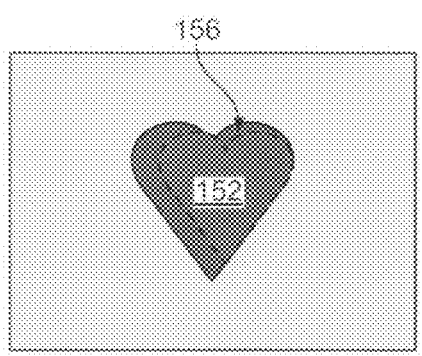
FIG. 1C
(Prior Art)
FIG. 1E
(Prior Art)

Foreground
(Vector)

AND

Shadow
(Raster)

Soft Mask
(Raster)

Composited
(Not Trapped)

R (unimodal)

G (bimodal)

B

Idealized Representation of Graphics Objects

Atomic Regions Identified

Boundary Paths Segmented (Exaggerated)

Naive Trapping
(Mismatch between Image Trapping Rule and Vector Trapping Rule)

Trapping with Drop Shadow Detection Using only Composited Color (Above Problems Solved but now Text Distorted)

AUTOMATIC TRAPPING OF DROP SHADOWS

BACKGROUND

The present disclosure relates to automatic determination of printing traps.

Computer-graphics illustrations are typically made up of graphical elements of various types. Types of graphical elements include rasterized images, glyphs, vector strokes, vector fills, image masks, soft masks and gradients. A graphical element typically includes a path which defines the boundary of the graphical element. Graphical elements can interact with each other (e.g., by overlapping). Hereafter, any illustration discussed is a computer-graphics illustration unless otherwise noted.

When an illustration is printed, a printing device can print color in the illustration using multiple print units (e.g., individual printing plates in a multi-plate printing press). If the print units are not properly aligned, colorless gaps characteristically occur between adjacent portions of the illustration having different colors. Gaps can also arise if, during the printing process, the medium on which the illustration is being printed shifts, shrinks as ink dries, or expands as ink is applied. Gaps can also arise as a result of inaccuracies during intermediate stages of the printing process, such as stretching of a film negative used to produce a printing plate. To reduce the likelihood of gaps in a printed representation of an illustration, a process called trapping is commonly used. Trapping involves creating so-called traps prior to printing: overlaps of color or underlaps of color, sometimes called spreads and chokes. Spreads make a graphical element larger so that the edges of the object print over an underlying object; chokes make the obscured area of the underlying object smaller than the outline of the foreground object. A trapping process typically creates thin areas which overlap the color boundaries of pairs of adjacent graphical elements so that if the color of one graphical element is misaligned relative to the color of another graphical element during printing, the overlap will prevent the formation of a gap between the graphical elements where no color is printed.

The rules used to trap an illustration typically depend on many factors, including the colors and types of the graphical elements being trapped. For example, when two adjacent rasterized images are trapped, usually both rasterized images are adjusted to extend a small amount over a common boundary between the elements, resulting in a "centerline trap." When two adjacent vector graphical elements (e.g., vector fills) are trapped, typically one graphical element is extended over the common boundary a larger amount, which results in a trap being located entirely on one side of the common boundary. Typically the graphical element of lighter color is spread into the graphical element of darker color. When a vector graphical element is trapped against a rasterized image, either a centerline trap can be used, so that the trap location does not change as the color of the image pixels change, or the lighter colored element can spread into the other element. Traps between gradient graphical elements and adjacent graphical elements can gradually move from one side of the boundary between graphical elements to the other as the color of the gradient changes, a so-called "sliding trap."

Another trapping rule requires that lighter colors spread into darker colors. An exception is opaque spot colors, in which case any colors applied earlier in the printing process are spread under the opaque spot color. Another exception is rich black (black printed with a screen of another color to deepen the black), which is trapped by choking the screened color away from the edge of the rich black, leaving a border of plain black and thereby preventing the color from fringing along the black border. Typically, the color overlap resulting from trapping is not noticeable, however in situations such as when two abutting pastel spot colors are trapped, a dark line along the boundary can result from trapping. To mitigate the visual impact of such a dark line, the colors can be lightened along the edge.

The extent of trapping required for a given illustration depends on the medium (e.g., how much will the medium expand when wetted by ink), the resolution, calibration, and type of printing press, as well as such things as the order in which the medium will be run through the printing press units, as mentioned previously.

Trapping an illustration by hand is a time-consuming process. While a computer program can be used to trap an illustration automatically, automatic trapping typically is guided by trapping rules that depend on the types of graphical elements involved. In some situations, such as with computer illustrations containing drop shadows, previous automatic trapping techniques produce undesirable results. The areas around drop shadows are typically computed as raster images, which means that a vector object which passes near a drop shadow can show an abrupt change in the trapping, for example, from trapping on the side of the darker graphical element to centerline trapping at a certain distance from the drop shadow. The abrupt change in trapping can be especially noticeable on small vector text, which can be obliterated by centerline trapping.

SUMMARY

In general, one aspect of the subject matter described in this specification can be embodied in a method that includes searching a sequence of graphical elements for a drop shadow idiom representing a drop shadow. If the drop shadow idiom is found, one or more graphical elements comprising the drop shadow idiom are replaced with a proxy drop shadow element. Other embodiments of this aspect include corresponding systems, apparatus, and computer program products.

These and other embodiments can optionally include one or more of the following features. The sequence of graphical elements is based on a sequence of marking operators. The graphical elements comprising the drop shadow idiom include a vector fill blended with a soft mask. The graphical elements comprising the drop shadow idiom include a raster image blended with a soft mask matching the height and width of the raster image. The raster image has one or more color channels. Each color channel corresponds to a histogram of frequencies of color channel intensities, where each color channel is uniformly zero, the color channel's corresponding histogram is unimodal, or the color channel's corresponding histogram is bimodal. The drop shadow is a visual effect comprising a darkened or colored version of a shadowing graphical element, which is offset from the shadowing graphical element and partially occluded by the shadowing graphical element. The graphical elements correspond to user-manipulable objects in a vector-based illustration program. The proxy drop shadow element is a path designated as a drop shadow.

In general, another aspect of the subject matter described in this specification can be embodied in a method that includes flattening graphical elements into a collection of atomic regions, the boundaries between atomic regions being paths. The paths are divided into segments. Each segment being incident to two atomic regions, one on each side. For at least one segment incident to an atomic region which includes a drop shadow: 1) for each side of the segment, determining a first flattened color of the side's incident atomic region, and if the atomic region includes a drop shadow, additionally determining a second flattened color omitting the color of the drop shadow; 2) for each side of each segment, determining an effective neutral density from the side's first flattened color and, if the side has a second flattened color, the side's second flattened color; and 3) trapping the two atomic regions incident to the segment based upon the effective neutral densities for the respective sides. Other embodiments of this aspect include corresponding systems, apparatus, and computer program products.

These and other embodiments can optionally include one or more of the following features. Trapping the two atomic regions comprises adjusting the boundary of the atomic region having the lighter effective neutral density to overlap the other atomic region. Trapping the two atomic regions comprises inserting an additional graphical element which partially overlaps the atomic region having the darker effective neutral density.

Particular embodiments of the invention can be implemented to realize one or more of the following advantages. Illustrations can be trapped automatically, saving time over manual trapping. Drop shadow idioms can be automatically identified. Effective neutral densities can be calculated in a way that compensates for the presence of drop shadows. Effective neutral densities can weight the drop shadows more or less depending on the width of the traps. Illustrations using drop shadows can be trapped without causing distortion in small text or discontinuities along boundaries between vector graphical elements and drop shadows. Illustrations using drop shadows can be automatically trapped without manual adjustments to trap settings.

The details of one or more embodiments of the invention are set forth in the accompanying drawings and the description below. Other features, aspects, and advantages of the invention will become apparent from the description, the drawings, and the claims.

Commonly assigned U.S. Pat. No. 5,542,052, by Deutsch et al. is incorporated herein by reference.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A-E illustrate trapping of a computer illustration.

Like reference numbers and designations in the various drawings indicate like elements.

DETAILED DESCRIPTION

Figure 2A:
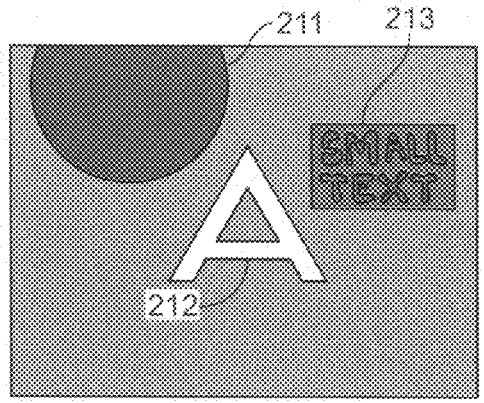
FIGS. 2A-D illustrate formation of a drop shadow.
Figure 2B:
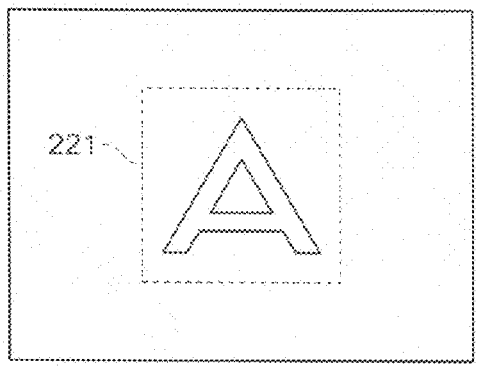
Figure 2C:
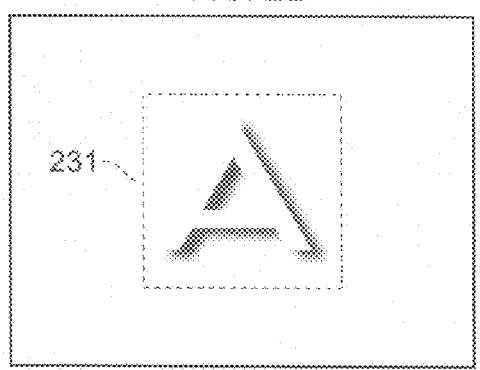

FIGS. 1A-E illustrate trapping of a computer illustration. FIG. 1A shows an original representation of an illustration that includes a magenta heart 112 on a yellow field 114. The illustration can be printed, for example, on a four color offset-lithography press, which has cyan, magenta, yellow, and black inks. The colors and the printing technology in this example are for illustrative purposes. Trapping applies equally to other colors and types of ink and to other printing technologies.

FIG. 1B shows an un-trapped, ideal printing of the illustration depicted in FIG. 1A. The heart 122 shape has been printed with magenta ink and the field 124 has been printed with yellow ink. In this ideal printing, the yellow and magenta inks are in register: abutting perfectly, with no overlap and no gaps. Unfortunately, in the real world, misregistration of colors is common. An un-trapped, imperfect printing of the illustration as might arise from misaligned printing units is shown in FIG. 1C. An overlap region 147 between the yellow field 144 and magenta heart 142 is apparent in FIG. 1C, as is a white gap 148 where the paper shows through. The misalignment of the inks is obvious to the human eye because white hairline gaps (e.g., 148) appear on one side of printed objects while darkened double printing (e.g., 147) appears on the other side.

A solution to the misalignment of printing units is trapping. A trapped, ideal printing of the illustration depicted in FIG. 1A is shown in FIG. 1D. As a result of trapping, the yellow ink of the background 134 has been spread into the magenta ink of the heart 132, resulting in a thin red (magenta+yellow) border 136 inset around the heart 132, and leaving the appearance of the background field 134 the same. The red is not especially noticeable compared to the magenta, and the overall shapes on the page remain the same. A trapped, imperfect printing of the illustration depicted in FIG. 1A is shown in FIG. 1E. The misregistration is similar to that depicted in FIG. 1C. Misregistration is not as apparent when the illustration has been trapped. The border 156 around the heart 152 has become thicker and thinner in places but hairline white gaps (e.g., 148) are absent. The traps in FIGS. 1D and 1E are exaggerated for illustrative purposes.

Figure 2D:
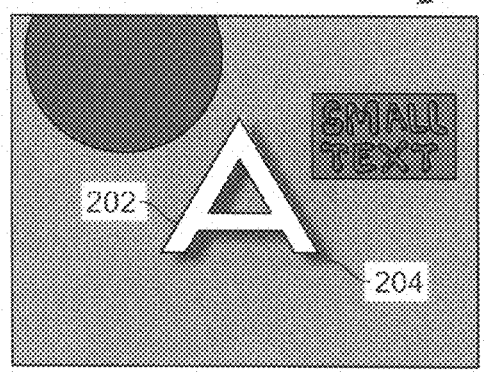
Figure 2D:
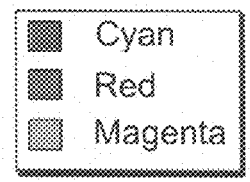

FIGS. 2A-D illustrate formation of a drop shadow. In various implementations, a drop shadow is a darkened version of a shadowing graphical element and is offset from, and partially occluded by, a shadowing graphical element. An example of a drop shadow 204 for the letter 'A' 202 is shown in FIG. 2D. The drop shadow 204 can be assembled from graphical elements which constitute a drop shadow idiom depicted in FIGS. 2B-C and applied to a foreground element depicted in FIG. 2A.

The foreground graphical elements depicted in FIG. 2A are vector graphical elements as might be created with a vector-based illustration program such as Adobe Illustrator, available from Adobe Systems Incorporated of San Jose, Calif. The foreground graphical elements include a circle 211, a large letter 'A' 212, and small text 213. The large letter 'A' 212 will have a drop shadow applied.

There are several ways to construct drop shadows out of graphical elements. For example, one approach is to create a shadow raster image 221 having a boundary indicated in FIG. 2B by a dashed line. The shadow raster image 221 shows the large letter 'A' 212 offset slightly and colored darkly to imitate a real life shadow. The shadow raster image 221 need not be black and white; the shadow could be any color including more than one color. The resolution of the shadow raster image 221 can be created to match a resolution of an intended output device.

The shadow raster image 221 is then rendered using a soft mask 231 (having a boundary indicated by a dashed line), which can be a type of bitmap whose values measure degrees of shape or opacity. In various implementations, the soft mask 231 determines whether corresponding points of a shadow raster image 221 are visible and how the shadow raster image color blends with graphical elements that lie beneath the shadow raster image 221, if any. For example, the soft mask 231 can give a shadow raster image 221 soft edges, adding realism to the illustration.

In some implementations, it is immaterial whether the height or width of the shadow raster image matches that of the soft mask. The soft mask can be automatically stretched and repositioned as necessary to match the shadow raster image in size, shape and position on the page. When shadow raster images are used with soft masks to construct drop shadows, standard practice is for the heights and widths to match. Thus, in some implementations, an identifying characteristic of drop shadow idioms is that the height and width of the soft mask match the height and width of the shadow raster image.

The foreground graphical elements 211, 212 and 213 are composited with the shadow raster image 221 using the soft mask 231 to produce the intended illustration shown in FIG. 2D. An idealized representation of the intended illustration is shown in FIG. 2D, without trapping and without printing misregistration. Together the shadow raster image 221 and the soft mask 231 constitute a "drop shadow idiom." Generally speaking, a drop shadow idiom is a soft mask and image data that are correlated. For example, the non-zero raster data and the soft mask are correlated (i.e., a soft mask is typically created by blurring a solid constant color fill of version or the graphic element's shape which is typically a raster image) and the soft mask shape is also correlated with the graphical element the soft mask is shadowing.

Another approach for constructing a drop shadow, not shown in FIG. 2, is to use a vector graphical element instead of the shadow raster image. A vector graphical element, filled with the desired shadow color, can be blended with a soft mask as before. The combination of a vector fill and soft mask is a drop shadow idiom, as well. Note, here also that the soft mask shape is correlated with the graphical element that the soft mask is shadowing. Other drop shadow idioms are possible and fully within the spirit of the present disclosure.

Figure 3A:
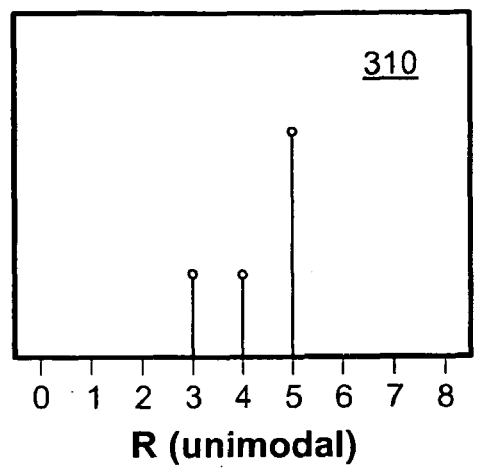
FIGS. 3A-C show color channel histograms for a raster image that, together with a soft mask, constitute a drop shadow.
Figure 3B:
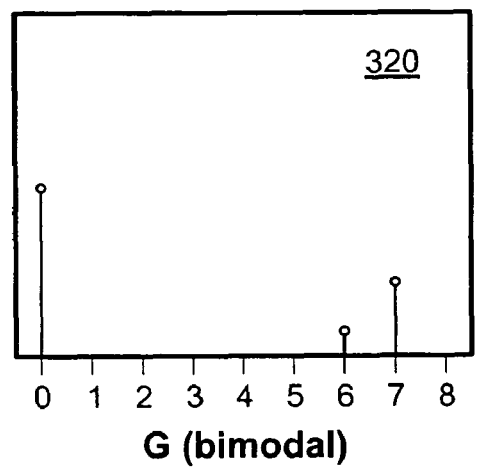
Figure 3C:
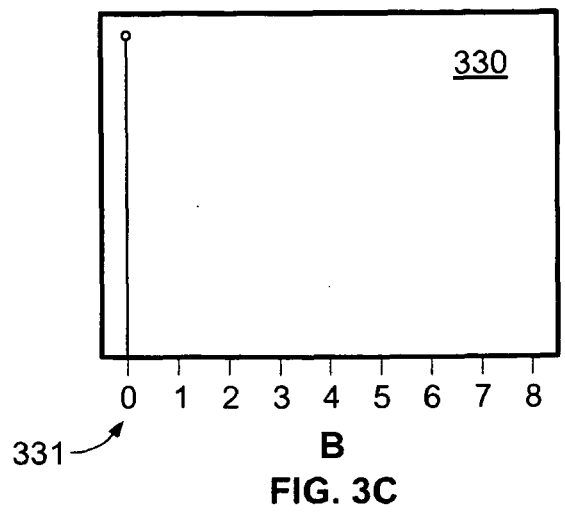

FIGS. 3A-C show exemplary color channel histograms for a raster image that, together with a soft mask, constitute a drop shadow idiom. The histograms illustrate that there are identifiable characteristics of a drop shadow idiom. The bins along the x-axis represent the number of pixels with various intensities of red, ranging from zero for the pixels without any red, up to some maximum. The y-axis represents the number of pixels for each red color intensity in the raster image. A red histogram 310 in FIG. 3A depicts a unimodal distribution of red colors in a raster image. Similarly, green 320 (FIG. 3B) and blue 330 (FIG. 3C) histograms show the distribution of green and blue color intensities, respectively, in the raster image. The green histogram 320 exhibits a bimodal distribution of green colors in the raster image. Whereas the blue histogram 330 exhibits a uniformly zero distribution of blue colors in the raster image—the zero bin 331 has all the pixels in it; all the other bins are empty. Histograms generated from a raster image in a drop shadow idiom can be unimodal, bimodal, or uniformly zero. Thus, one way of detecting drop shadow idioms is to determine whether a raster image in the putative drop shadow idiom has color channel histograms which are unimodal, bimodal, or uniformly zero.

Figure 4:
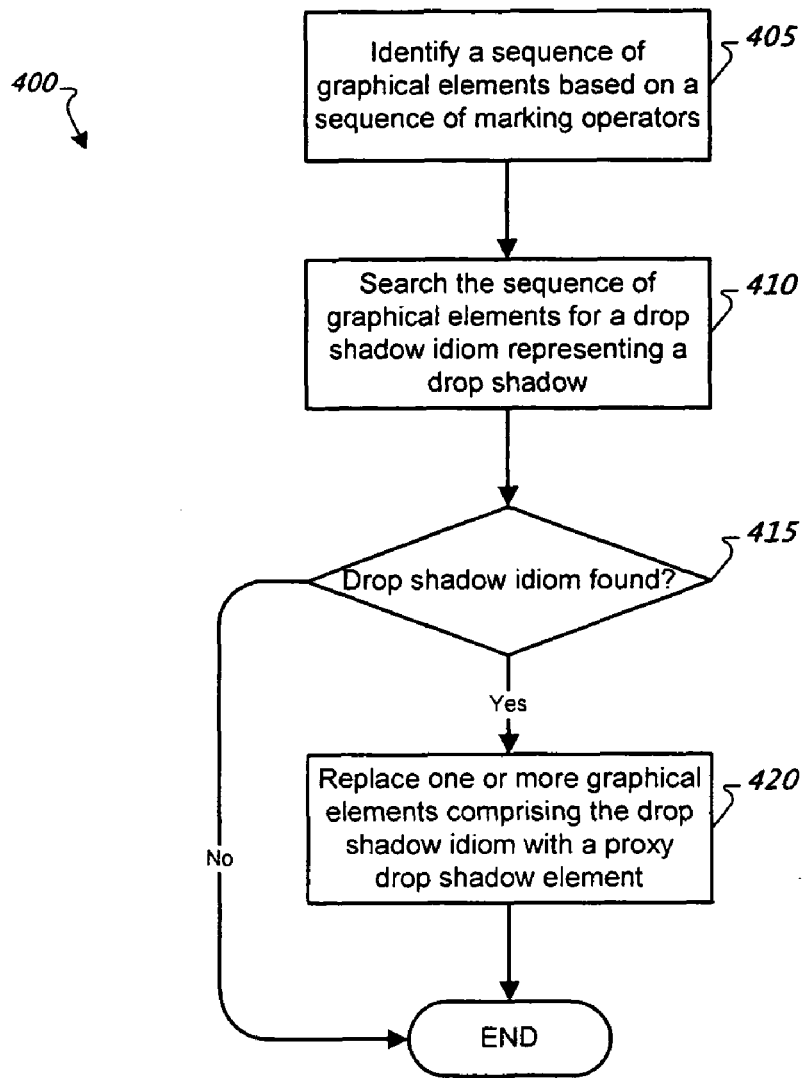
FIG. 4 illustrates an example process for detecting and replacing drop shadow idioms in a sequence of graphical elements.

FIG. 4 illustrates a process 400 for detecting and replacing drop shadow idioms in a sequence of graphical elements.

Characteristics of drop shadow idioms, such as those set out in FIG. 3, for example, can be detected by software, hardware, or combinations of these, for special handling during trapping. In some implementations, a sequence of graphical elements is identified based on a sequence of marking operators (step 405). Marking operators are a feature of page description languages such as the Adobe Portable Document Format (PDF) language, for example. Marking operators identify a set of related objects in a document as a single unit for the convenience of other software which will later read the document. For illustrative purposes, concepts will be described with reference to PDF documents. However, other document formats are possible.

Each page in a PDF file is represented by one or more content streams. The content streams are objects whose data consists of a series of instructions describing the graphical elements to be rendered onto a page. The instructions are represented as PDF objects. These low-level objects can be grouped together using PDF marking operators to represent higher-level graphical elements. The sequence of graphical elements is searched for a drop shadow idiom representing a drop shadow (step 410). If a drop shadow idiom is found (step 415), one or more of the graphical elements making up the drop shadow idiom are replaced with a proxy drop shadow element (step 420). The proxy drop shadow element can subsequently be specially handled by other software or hardware to allow the use of special trapping rules for drop shadows. For example, if a shadow raster image with an associated soft mask is determined to be a drop shadow idiom, the shadow raster image can be replaced by a proxy drop shadow element.

Figure 5:
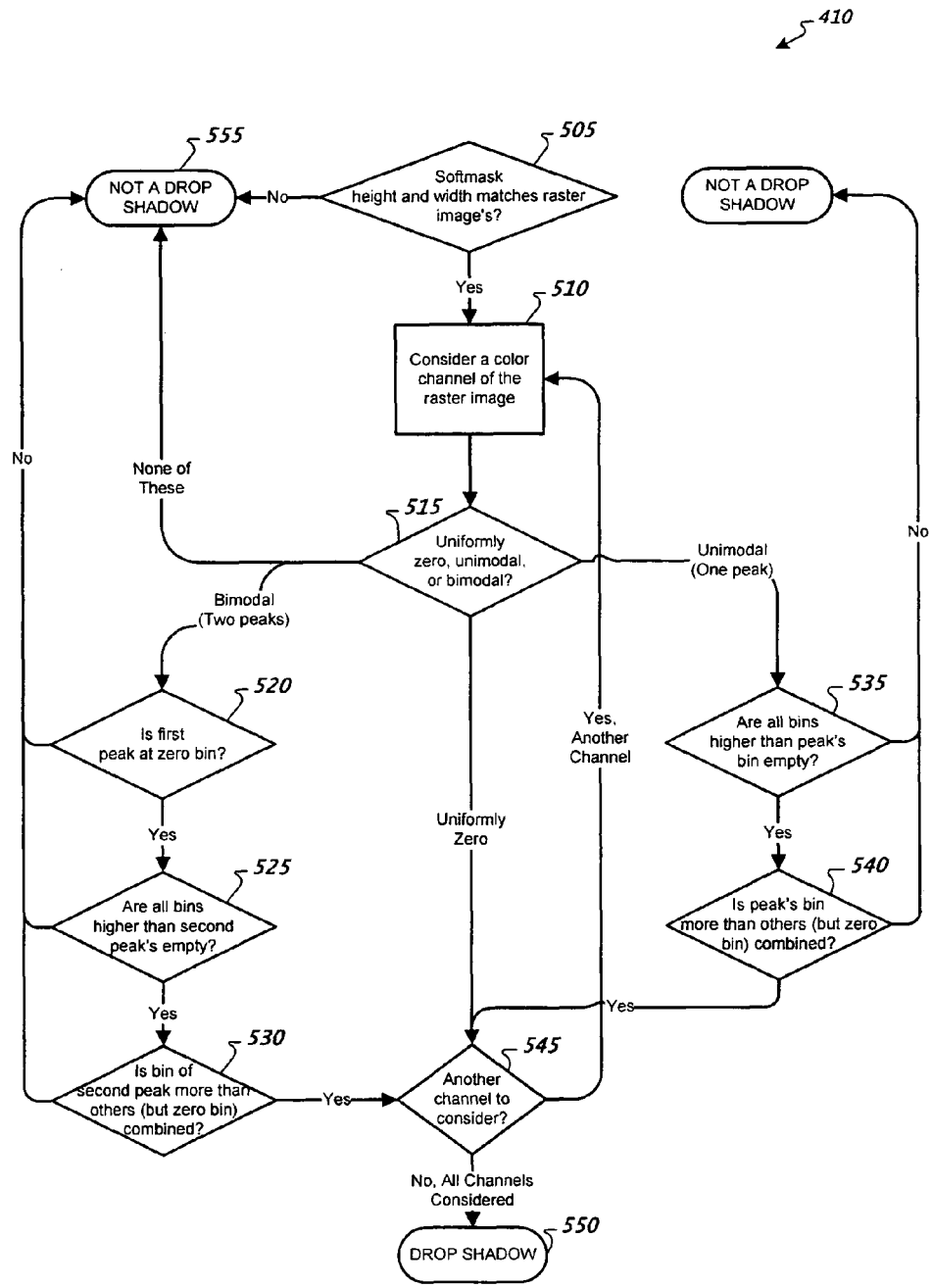
FIG. 5 illustrates an example process for determining whether a raster image and soft mask represent a drop shadow idiom.

FIG. 5 illustrates an example process 410 for determining whether a raster image and soft mask represents a drop shadow idiom. Drop shadows can be represented in different ways, depending on the application program used to create a drop shadow. Hence, there are other ways for detecting drop shadows besides the method given here. The first test is whether the soft mask's height and width match the height and width of the raster image (step 505). Some computer graphic illustration programs which produce drop shadows using shadow raster images typically set the height and width to match. Thus, if the height and width do not match, the raster image is not part of a drop shadow idiom (step 555). Otherwise, individual color channels of the purported shadow raster image are tested one by one (step 510).

It is determined whether a color channel for the raster image represents a uniformly zero (e.g., FIG. 3C), unimodal (e.g., FIG. 3A), or bimodal (e.g., FIG. 3B) color distribution (step 515). If the color channel has some other distribution, the raster image is not part of a drop shadow idiom (step 555). A uniformly zero color distribution means that for each pixel in the raster image, that pixel's color channel intensity is zero. If the color channel represents a uniformly zero distribution, another color channel is considered (step 545) if in fact there is another color channel in the raster image to test. Otherwise, if all the color channels have passed the tests, the raster image is identified as being part of a drop shadow idiom (step 550). It is not necessary for all color channels to pass the same set of tests. As illustrated in FIG. 3, any color channel can pass any test: bimodal histogram, unimodal histogram, or uniformly zero histogram.

A bimodal distribution has two peaks. The first peak, by convention, is the peak at the lower-numbered bin. It is determined whether the first peak is at the zero bin (step 520). It is also determined whether the second peak is at the highest non-empty bin (step 525). Thus, there can be non-empty bins between the two peaks, but nowhere else. Any non-empty bins between the two peaks must be relatively empty. More specifically, it is determined whether the second peak's bin (i.e., how many pixels in the raster image had that intensity value for that color channel) is at least the total of all other bins, excluding the zero bin. (step 530). If all these tests are passed, another channel is considered (step 545), as before.

A unimodal distribution has one peak. The determinations are similar for a unimodal histogram. It is determined whether the peak is at the highest non-empty bin (step 535), and it is determined whether the frequency of the peak's bin meets or exceeds the total of all the other bins, excluding the zero bin (step 540). If both these determinations are passed, another channel is considered (step 545), as before.

Figure 6A:
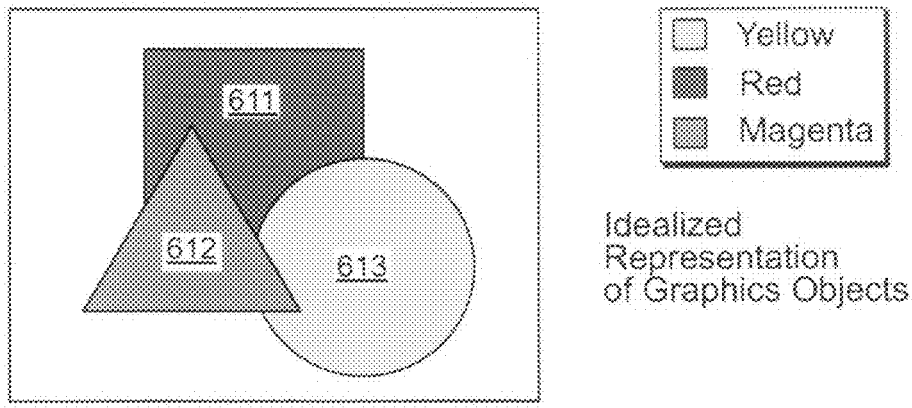
FIGS. 6A-D illustrate an example of flattening atomic regions and segmenting boundaries between atomic regions.

FIGS. 6A-D illustrate an example of flattening atomic regions and segmenting boundaries between atomic regions. Flattening is the process of determining a single opaque graphical element which closely approximates the appearance of the original collection of graphical elements in an atomic region, taking into account transparency and other effects. FIG. 6A shows a triangle 612 layered or stacked on top of a circle 613 and a square 611. The circle 613 is also stacked on top of the square 611. Atomic regions are non-null intersections of the areas of the graphical elements. The areas of graphical elements are delineated by boundaries. Therefore, atomic regions are themselves delineated by boundaries, and within any atomic region, there are no boundaries.

Figure 6B:
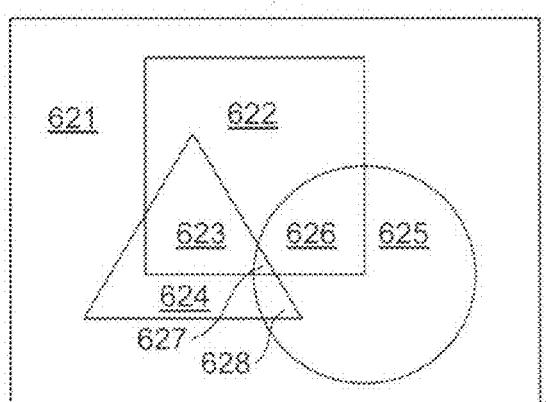

Atomic regions signify that the stacking of graphical elements at any point within the region is constant. That is, there are n graphical elements within an atomic region, stacked flat on one another like sheets of paper. For example, a pencil pierced through the stack within an atomic region would hit all n graphical elements, and no matter where the pencil pierced the stack, within the atomic region, it would always intersect the n graphical elements in the same order. The graphical elements can individually extend beyond the atomic region, and those parts that extend beyond the atomic region are part of other atomic regions. In other words, each graphical element can be divided into many atomic regions. FIG. 6B shows all the atomic regions for the graphical elements shown in FIG. 6A. The lines represent the boundary of an atomic region, and there are eight atomic regions depicted: 621, 622, 623, 624, 625, 626, 627, and 628. In atomic region 623 shown in FIG. 6B, for example, there are just two objects, the square and the triangle. At any point within atomic region 623, the triangle is always above the square. In atomic region 625 there is only the circle, and the circle fills the entire atomic region.

Figure 6C:
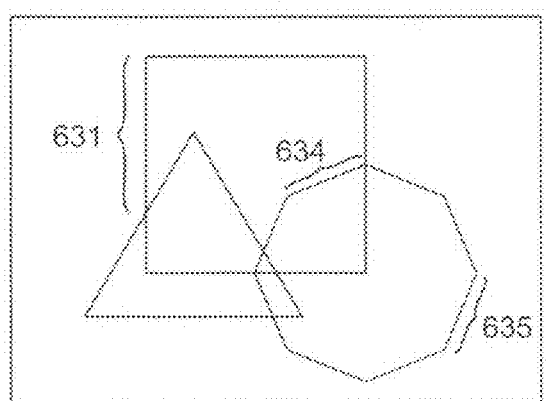

In some implementations, the boundaries of atomic regions are paths similar to the paths in a PDF file. A PDF path is an arbitrary shape composed of straight lines and cubic Bézier curves, and can intersect itself and have disconnected sections and holes. As shown in FIG. 6C, paths can be segmented into line segments (e.g., 634 and 635) for trapping. How short the line segments need to be and the number of line segments required to approximate a path can depend on the resolution of the output device, as well as the nature of the boundaries. More line segments result in more accuracy for curved boundaries. For example, the boundary of a square is straight, so segmenting the boundary can result in a few rather long line segments (e.g., 631). On the other hand, a circle's boundary is curved. Therefore, approximating a circle's boundary requires a larger number of small segments (e.g., the eight segments exemplified by 634 and 635). The line segments 634 and 635 are exaggerated in FIG. 6C to show that line segments are sometimes only an approximation to the paths.

In some implementations, the degree of segmentation depends on the colors of the graphical elements as well as their curvature and the resolution of an intended output device. For example, a square filled with a gradient would have the paths in its boundary divided into many segments to more accurately trap the color. In other implementations, segmentation does not depend on the colors of the graphical elements.

Figure 6D:
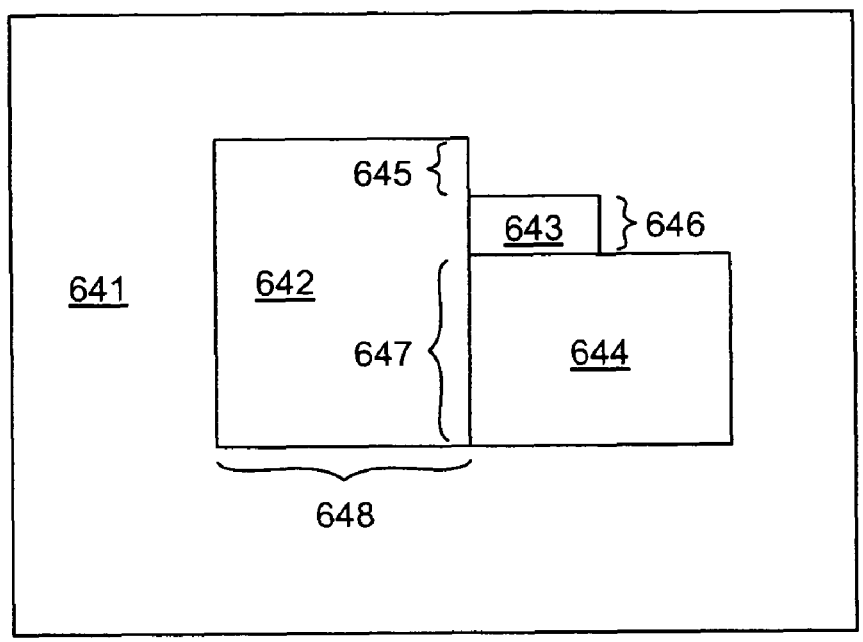

FIG. 6D is another illustration of atomic regions, depicting three non-overlapping rectangles. In this illustration, there are four atomic regions 641, 642, 643, and 644 corresponding to the interiors of the rectangles, plus the exterior. Several paths 645, 646, 647, and 648 on the boundary of an atomic region are indicated, as well. Each path abuts two atomic regions. For example path 646 abuts atomic region 641 and atomic region 643.

Figure 7A:
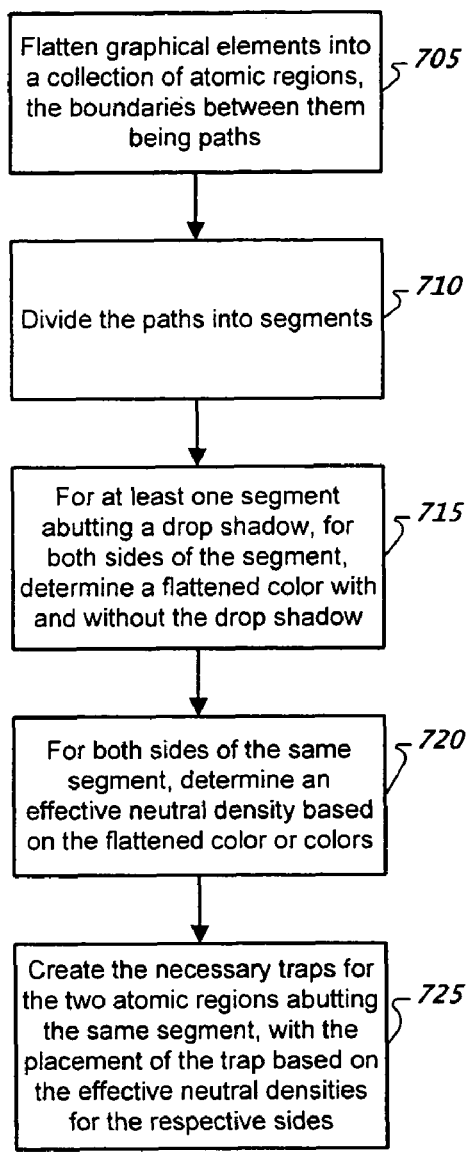
FIGS. 7A-C illustrate an example process for, automatic trapping of drop shadows.
Figure 7B:
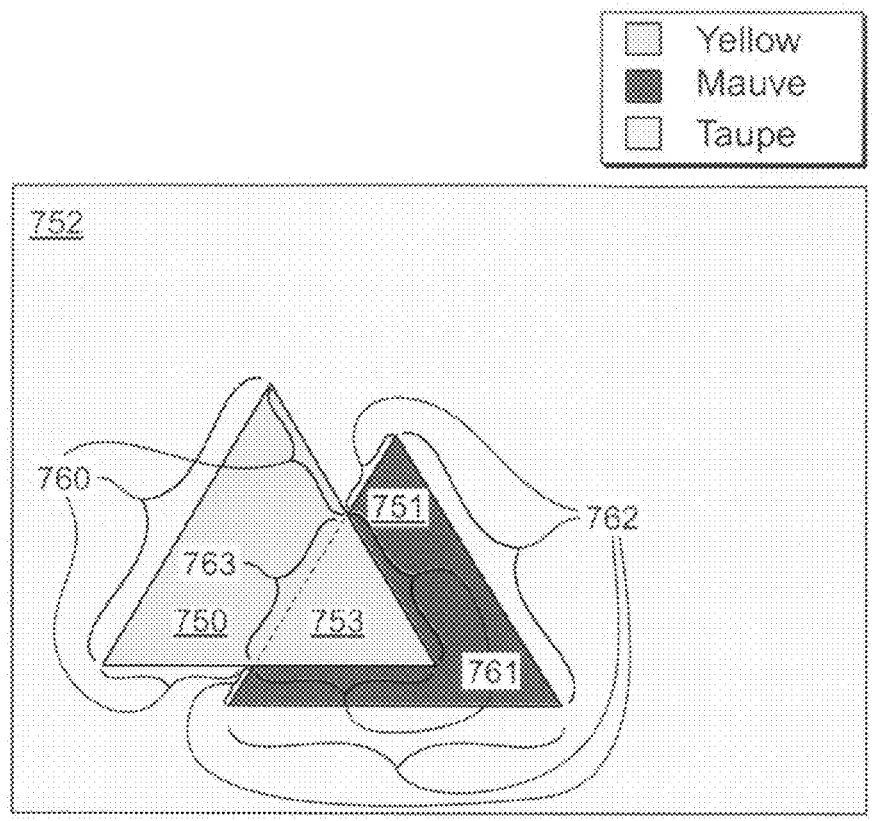
Figure 7C:
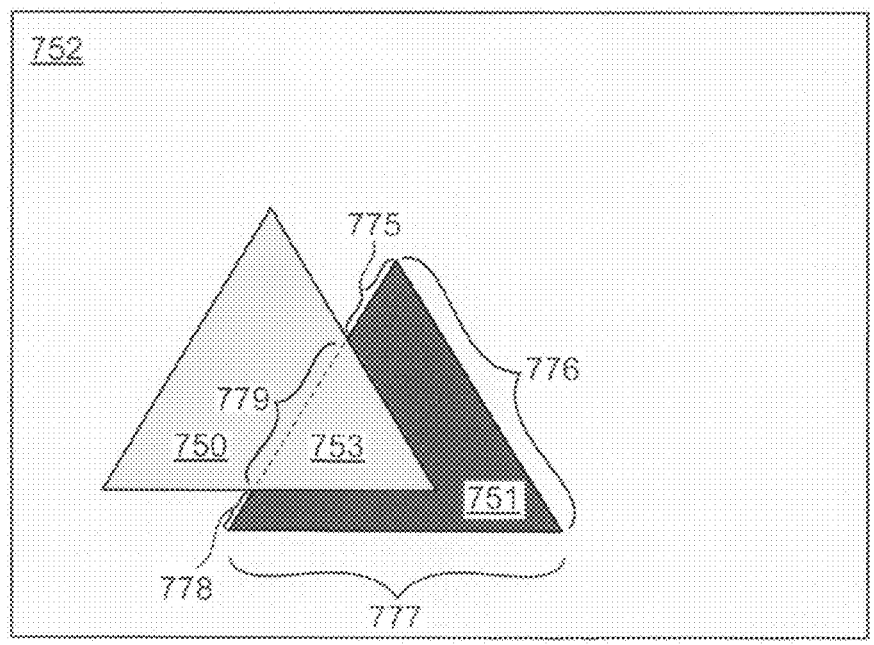

FIGS. 7A-C illustrate an example process 700 for automatic trapping of drop shadows. Graphical elements are flattened into a collection of atomic regions, the boundaries between the atomic regions being paths (step 705). In some implementations, the flattening is done through rasterization at a resolution chosen to match the resolution of an intended output device. Flattening can also be done at device resolution before rasterization.

For simplicity of exposition, it is assumed that each path of a boundary abuts two atomic regions, and between two such atomic regions there is only one boundary edge. In FIG. 7B, atomic regions 750, 751, 752, and 753 are divided by paths 760, 761, 762, and 763. Atomic regions 750 and 753 together form a triangle which has a drop shadow. The drop shadow is visible in atomic regions 751 and 753, although part of the drop shadow, represented by atomic region 753, is occluded and therefore not visible. The background field is represented by atomic region 752. Atomic regions 750 and 752 abut path 760; atomic regions 751 and 752 abut path 762, and atomic regions 751 and 753 abut path 761.

The paths are divided into segments (step 710). It is assumed that there is at least one visible drop shadow among the graphical elements. In FIG. 7B, the visible part of the drop shadow is represented by atomic region 751. Each graphical element is a member of at least one atomic region. Thus, there is an atomic region with a drop shadow. Atomic regions are bounded by paths, as explained above. Thus, there is a path abutting the atomic region which contains the drop shadow. In FIG. 7B, these are paths 761 and 762. All paths bounding atomic regions are divided into segments, as explained above. In FIGS. 7B-C, path 762 is segmented into segments 775, 776, 777, and 778. Thus, there is a segment abutting the atomic region with a visible drop shadow. In FIG. 7C, segment 775 is such a segment, as it abuts atomic region 751. As explained above, it is assumed that all paths abut two atomic regions. All line segments have two sides. On each side of a line segment is an atomic region. In FIG. 7C, abutting the sides of segment 775 are atomic regions 751 and 752. Thus, the segment also abuts a second atomic region which may or may not also have a visible drop shadow. In FIG. 7C, the second atomic region abutting segment 775 is region 752, which does not have a visible drop shadow.

Both sides of the segment are assigned flattened colors corresponding to the abutting atomic regions (step 715). Flattening is explained above in reference to FIGS. 6A-C. After flattening the atomic regions, representative colors of the two flattened atomic regions abutting the segment are associated with the segment. Because the segments are assumed to be relatively small, as explained above in reference to FIG. 6C, it is not important how the representative colors are determined, so long as the colors are based on a part of the atomic region near the segment. For example, the color of the output device-resolution pixel of an atomic region nearest the midpoint of the segment can be used as the representative color for that atomic region. Alternatively the colors of many pixels near the segment can be averaged to determine a representative color for the atomic region. In FIG. 7C, assume that the triangle represented by atomic regions 750 and 753 is yellow, the visible part of the drop shadow represented by atomic region 751 is mauve, and the field represented by atomic region 752 is taupe. For each side, if the abutting atomic region contains a visible drop shadow, the side of the segment is associated with two colors: the abutting atomic region's representative color, and the abutting atomic region's representative color, recomputed to omit the drop shadow. Thus, because one side of segment 775 abuts an atomic region containing a visible drop shadow, namely atomic region 751, that side is associated with both mauve and taupe. Otherwise, if the atomic region abutting the side does not contain a drop shadow, the side of the segment is associated with only one color, the atomic region's representative color. Thus, the other side of segment 775, which abuts atomic region 752 which does not contain a visible drop shadow, is associated with taupe only.

An effective neutral density is computed for each side of the segment based on the assigned flattened colors (step 720). Effective neutral density is a measure of color darkness in a subtractive color space, which applies to inks on a printing press. Black has a high neutral density (e.g., 1.7) and yellow has a low neutral density (e.g., 0.15). The effective neutral densities of two abutting graphical elements can be compared to position the trap relative to the position of the color boundary. If the side has two flattened colors (i.e., the side's atomic region contains a drop shadow), the effective neutral density can be computed as a weighted combination of the neutral density of the flattened colors.

One weighted combination is a simple average. Thus, the total effect is that the drop shadow only contributes half as much to the effective neutral density. Thus, as one side of segment 775 is associated with two colors, mauve and taupe, the effective neutral density for the side is the average of the neutral densities of taupe and mauve. Otherwise, if the side has only one flattened color (i.e., the side's atomic region does not contain a drop shadow) the effective neutral density is merely the effective neutral density of the flattened color. Thus, the effective neutral density of the other side of segment 775, which is only associated with taupe, is the neutral density of taupe.

An alternative to a simple averaging of the two neutral densities is a weighting function which favors one of the neutral densities. For example, packaging and flexographic printers may use wider traps, therefore they may achieve more desirable results by weighting the average towards the neutral density which omits the drop shadow. Printers using narrower traps may achieve more desirable results by weighting the average towards the neutral density which includes the drop shadow.

The two atomic regions abutting the segment are trapped, based upon the effective neutral densities for the respective sides (step 725). In some implementations, the boundary of the atomic region with the lower effective neutral density is extended over the boundary of the atomic region with the higher effective neutral density, to provide a small degree of overlap. In FIG. 7C, in such an implementation, atomic region 752 would extend over segment 775 into atomic region 751, assuming that the neutral density of taupe is less than the neutral density of mauve. In other implementations, tiny graphical elements are added over the atomic region with the higher neutral density, with the same color as the atomic region with the lower neutral density, to achieve the same overlap effect.

In other implementations, the graphical elements are not flattened into atomic regions. These implementations directly use the paths of the graphical elements. The paths of the graphical elements are segmented, as in the implementation described above. In the subsequent steps, rather than assigning colors of the flattened atomic regions to the segments, colors are blended from the graphical elements near the segments. The blending can be done to approximate the flattened colors without needing to flatten the entire image.

Figure 8A:
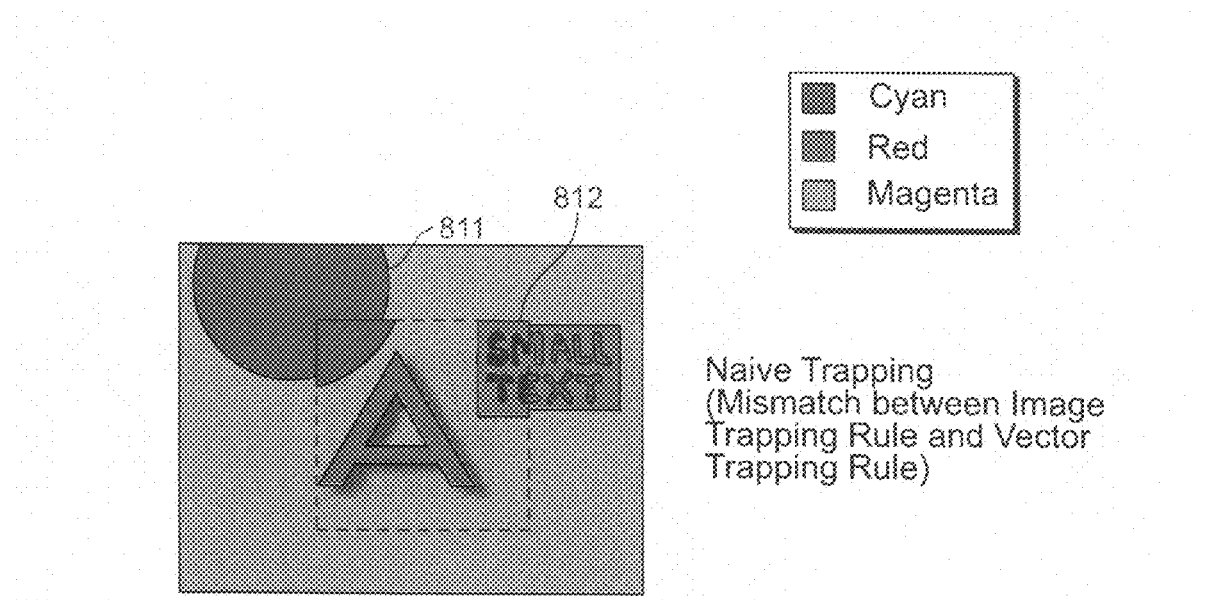
FIGS. 8A-B illustrate examples of problems trapping with drop shadows.
Figure 8B:
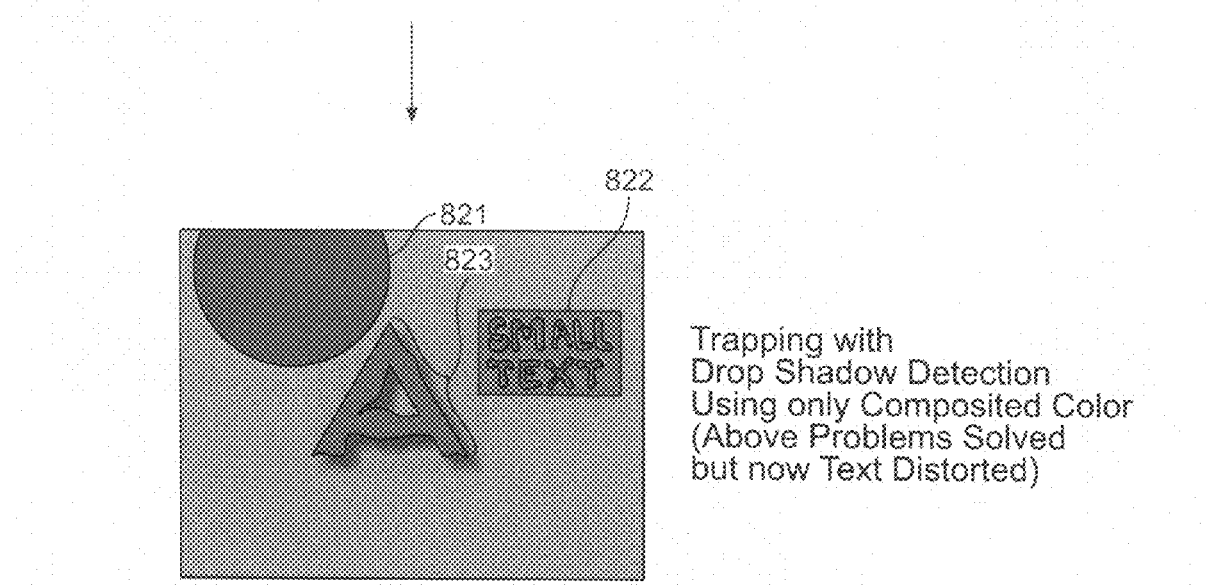

FIG. 8A-B illustrate examples of problems trapping with drop shadows. As previously mentioned in the discussion of FIG. 2, a typical drop shadow idiom uses a soft mask applied to a shadow raster image or a vector graphical element. However, other idioms for drop shadows are possible. The soft mask outline 231 in FIG. 2 extends beyond the drop shadow. The soft mask is itself a kind of raster bitmap, representing shape or opacity, thus, the entire region within the soft mask outline is rendered as a raster image. Therefore, the trapping rules treat the entire region within the soft mask outline as a raster image. Trapping rules optimized for raster images are different from trapping rules optimized for vector graphical elements. Therefore, the mismatch in trapping rules resulting from trapping drop shadow idioms as shown in FIG. 8A can result in unpleasant artifacts across a soft mask outline. For example, the circle 811 has a discontinuity across the soft mask outline, and the small text 812 is obliterated inside the soft mask outline.

Figure 8C:
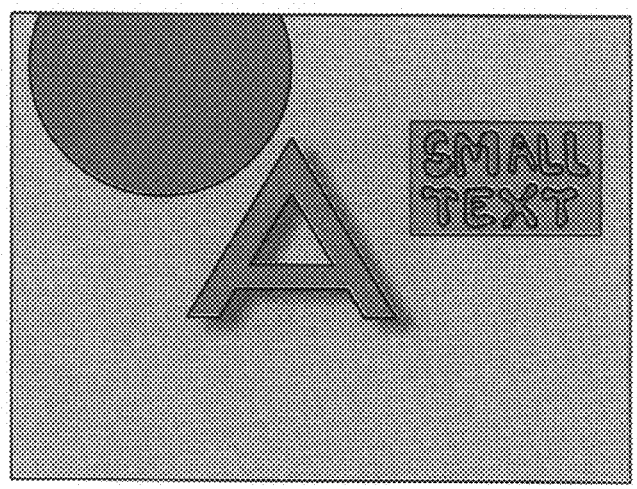
FIG. 8C illustrates a properly trapped drop shadow.

Replacing drop shadow idioms with proxy drop shadow elements forces vector trapping rules to be used for graphical elements within the bounds of the drop shadows. As shown in FIG. 8B, the circle 821 no longer has a discontinuity and the small text 822 is preserved. Unfortunately, the vector trapping rule causes text distortion 823 with drop shadows. If text is medium-colored against a light background, a drop shadow will cause part of the text to be surrounded by dark and the rest to be surrounded by light. A vector trapping rule specifies that lighter inks should spread into darker inks. Therefore, around the boundary of each character in the text, sometimes the background's ink will spread into the character, and sometimes the character's ink will spread into the drop shadow. The effect is that the trapping causes the boundary of the character to appear to move in and out. The solution is to underweight the color of the drop shadow. Underweighting the color of the drop shadow makes it less likely that the character's ink will spread into the drop shadow, which makes the trapping more consistent around each character. This is why the effective neutral density uses a weighted combination of the neutral densities of the flattened color with and without the drop shadow in step 720. By using proxy drop shadow elements and effective neutral densities, the problems in FIGS. 8A and 8B are eliminated, as shown in FIG. 8C.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example core memory devices; semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

While this specification contains many specifics, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:
1. A computer-implemented method wherein the computer comprises one or more processors, the method comprising:
 searching, by the one or more processor, a sequence of graphical elements corresponding to a computer-graphics illustration for a drop shadow idiom representing a drop shadow, where the drop shadow idiom comprises image data and a soft mask that are correlated; and
 determining that a drop shadow idiom is found and replacing, by the one or more processors, one or more graphical elements comprising the drop shadow idiom with a proxy drop shadow element such that the drop shadow can be trapped using the proxy drop shadow.

2. The computer-implemented method of claim 1, where:
the sequence of graphical elements is based on a sequence of marking operators.

3. The computer-implemented method of claim 1, where:
the graphical elements comprising the drop shadow idiom include a vector fill blended with a soft mask.

4. The computer-implemented method of claim 1, where:
the graphical elements comprising the drop shadow idiom include a raster image blended with a soft mask matching the height and width of the raster image.

5. The computer-implemented method of claim 4, where:
the raster image has one or more color channels, each color channel corresponding to a histogram of frequencies of color channel intensities, where each color channel is uniformly zero, the color channel's corresponding histogram is unimodal, or the color channel's corresponding histogram is bimodal.

6. The computer-implemented method of claim 1, where:
the drop shadow is a visual effect comprising a darkened or colored version of a shadowing graphical element, which is offset from the shadowing graphical element and partially occluded by the shadowing graphical element.

7. The computer-implemented method of claim 1, where:
the graphical elements correspond to user-manipulatable objects in a vector-based illustration program.

8. The computer-implemented method of claim 1, where:
the proxy drop shadow element is a path designated as a drop shadow.

9. A machine-readable storage device having computer program instructions encoded thereon, the instructions operable to cause a data processing apparatus to perform operations comprising:
searching a sequence of graphical elements corresponding to a computer-graphics illustration for a drop shadow idiom representing a drop shadow, where the drop shadow idiom comprises image data and a soft mask that are correlated; and
determining that a drop shadow idiom is found and replacing one or more graphical elements comprising the drop shadow idiom with a proxy drop shadow element such that the drop shadow can be trapped using the proxy drop shadow.

10. The storage device of claim 9, where:
the sequence of graphical elements is based on a sequence of marking operators.

11. The storage device of claim 9, where:
the graphical elements comprising the drop shadow idiom include a vector fill blended with a soft mask.

12. The storage device of claim 9, where:
the graphical elements comprising the drop shadow idiom include a raster image blended with a soft mask matching the height and width of the raster image.

13. The storage device of claim 12, where:
the raster image has one or more color channels, each color channel corresponding to a histogram of frequencies of color channel intensities, where each color channel is uniformly zero, the color channel's corresponding histogram is unimodal, or the color channel's corresponding histogram is bimodal.

14. The storage device of claim 9, where:
the drop shadow is a visual effect comprising a darkened or colored version of a shadowing graphical element, which is offset from the shadowing graphical element and partially occluded by the shadowing graphical element.

15. The storage device of claim 9, where:
the graphical elements correspond to user-manipulatable objects in a vector-based illustration program.

16. The storage device of claim 9, where:
the proxy drop shadow element is a path designated as a drop shadow.

17. A system comprising:
means for searching a sequence of graphical elements corresponding to a computer-graphics illustration for a drop shadow idiom representing a drop shadow, where the drop shadow idiom comprises image data and a soft mask that are correlated; and
means for determining that a drop shadow idiom is found and replacing one or more graphical elements comprising the drop shadow idiom with a proxy drop shadow element such that the drop shadow can be trapped using the proxy drop shadow.

18. The system of claim 17, where:
the sequence of graphical elements is based on a sequence of marking operators.

19. The system of claim 17, where:
the graphical elements comprising the drop shadow idiom include a vector fill blended with a soft mask.

20. The system of claim 17, where:
the graphical elements comprising the drop shadow idiom include a raster image blended with a soft mask matching the height and width of the raster image.

21. The system of claim 20, where:
the raster image has one or more color channels, each color channel corresponding to a histogram of frequencies of color channel intensities, where each color channel is uniformly zero, the color channel's corresponding histogram is unimodal, or the color channel's corresponding histogram is bimodal.

22. The system of claim 17, where:
the drop shadow is a visual effect comprising a darkened or colored version of a shadowing graphical element, which is offset from the shadowing graphical element and partially occluded by the shadowing graphical element.

23. The system of claim 17, where:
the graphical elements correspond to user-manipulatable objects in a vector-based illustration program.

24. The system of claim 17, where:
the proxy drop shadow element is a path designated as a drop shadow.

* * * * *